United States Patent [19]

McCullen et al.

[11] Patent Number: 4,645,751

[45] Date of Patent: Feb. 24, 1987

[54] REGENERATION OF NOBLE METAL-HIGHLY SILICEOUS ZEOLITE WITH SEQUENTIAL HYDROGEN HALIDE AND HALOGEN OR ORGANIC-HALOGEN COMPOUND TREATMENT

[75] Inventors: Sharon B. McCullen, Newtown, Pa.; Stephen S. Wong, Medford; Tracy J. Huang, Lawrenceville, both of N.J.

[73] Assignee: Mobil Oil Corporation, New York, N.Y.

[21] Appl. No.: 814,082

[22] Filed: Dec. 23, 1985

Related U.S. Application Data

[63] Continuation of Ser. No. 580,925, Feb. 16, 1984, abandoned.

[51] Int. Cl.$^4$ .......................... B01J 29/38; B01J 38/44; B01J 38/42; C10G 35/08
[52] U.S. Cl. ...................................... 502/37; 208/140; 502/35; 502/36; 502/71; 502/74; 502/77
[58] Field of Search ..................................... 502/35-37, 502/71, 74, 77; 208/140

[56] References Cited

U.S. PATENT DOCUMENTS

| 3,939,061 | 2/1976 | Paynter et al. | 502/35 |
| 3,981,823 | 9/1976 | Yates | 208/140 |
| 3,986,982 | 10/1976 | Crowson et al. | 502/37 |
| 4,359,400 | 11/1982 | Landolt et al. | 502/53 |
| 4,431,746 | 2/1984 | Rollman | 502/74 |
| 4,444,895 | 4/1984 | Fung et al. | 502/37 |
| 4,447,551 | 5/1984 | Fung et al. | 502/35 |

Primary Examiner—P. E. Konopka
Attorney, Agent, or Firm—A. J. McKillop; M. G. Gilman; L. P. Hobbes

[57] ABSTRACT

A process is described for rejuvenation of a deactivated highly siliceous noble metal-containing zeolite catalyst which contains agglomerated noble metals. The process comprises initially reducing the deactivated catalyst in hydrogen, pretreating the thus reduced catalyst with an inert gas stream containing about 0.001 to 10 weight percent hydrogen chloride, redispersing the noble metal with an inert gas stream containing about 0.001 to 10 weight percent Cl in the form of $Cl_2$ or Cl-containing organic material, and subsequently reducing the catalyst. The Cl-treatments may optionally occur in the presence of oxygen or sources of oxygen.

20 Claims, No Drawings

REGENERATION OF NOBLE METAL-HIGHLY SILICEOUS ZEOLITE WITH SEQUENTIAL HYDROGEN HALIDE AND HALOGEN OR ORGANIC-HALOGEN COMPOUND TREATMENT

This is a continuation of copending application Ser. No. 580,925, filed on Feb. 16, 1984, now abandoned.

BACKGROUND OF THE INVENTION

1. Field of the Invention

The present invention relates to a method for regenerating noble metal-containing highly siliceous zeolite hydrocarbon conversion catalysts. Such catalysts which have been deactivated during hydrocarbon conversion are regenerated by sequential contact with hydrogen, an inert gas containing 0.001 to 10 wt. % Cl in the form of HCl, an inert gas containing 0.001 to 10 wt. % Cl in the form of $Cl_2$ or a Cl-containing organic material, and hydrogen.

2. Description of the Prior Art

The deactivation of noble metal-containing hydrocarbon conversion catalysts due to the deposition on the catalyst of carbonaceous residues is a well-known phenomenon which has received much attention in the technical and patent literature. The problem with regard to catalyst deactivation is particularly acute with respect to supported noble metal-containing catalysts employed in the reforming of naphtha feedstocks. Undesired metal migration and agglomeration can occur during preparation, calcination, or oxidative regeneration of such catalysts, resulting in significant losses in catalyst properties such as activity.

Numerous methods have been suggested by prior workers for the regeneration of supported noble metal catalysts which have been deactivated by the deposition of carbonaceous residues. In U.S. Pat. Nos. 2,916,440; 3,243,384; 3,201,355; and 3,654,182 there are disclosed procedures utilizing gaseous mixtures containing oxygen and a halogen or halogen compound, particularly hydrogen chloride, for dissipating carbonaceous residue. In U.S. Pat. No. 3,378,419 there is disclosed a procedure for the regeneration of supported platinum catalysts involving (a) addition of halogen to the catalyst while in contact with the process feedstock; and (b) burning the coke deposits from the catalyst with an oxygen-containing, halogen free regeneration gas. It is also known in the art to regenerate platinum group metal-containing zeolite catalysts. Regeneration of noble metal-loaded zeolite catalysts requires certain procedural modifications because the metal must be returned in a dispersed form within the zeolite pores. U.S. Pat. No. 3,986,982 to Crowson et al treats deactivated platinum group metal-loaded zeolites by contacting them with a stream of an inert gas containing from 0.5 to 20 percent volume of free oxygen and from 5 to 500 ppm volume of chlorine as $Cl_2$, HCl, or an organic chlorine-containing material. The resulting catalyst is purged to remove residual oxygen and chlorine and then reduced in a stream of hydrogen at 200° to 600° C.

U.S. Pat. No. 4,359,400 to Landolt et al. teaches a method of regenerating deactivated supported multimetallic platinum-containing hydrocarbon conversion catalysts in the absence of oxygen or oxygen sources. The catalysts are contacted with an oxygen-containing gas at elevated temperatures followed by contact with a dry oxygen-free, hydrogen halide. The catalyst is then activated in the presence of chlorine gas in the absence of oxygen or oxygen sources such as water, followed by reduction with hydrogen. The catalysts regenerable by Landolt et al's method may contain support materials comprising an aluminosilicate zeolite such as naturally occurring or synthetic erionite, mordenite, or faujasite.

The prior known methods notwithstanding, regeneration of highly siliceous materials which contain noble metals has been found to be particularly difficult. For example, treatment of agglomerated platinum on silica using a variety of chlorine containing compounds with water and oxygen in an inert gas results in a large loss of platinum from the silica support. Similarly, the zeolite regeneration process of U.S. Pat. No. 3,986,982 described above has not been found suitable for use in the regeneration of highly siliceous zeolites, that is, for example, zeolites having a framework silica to alumina ratio of at least about 20, say about 30.

SUMMARY OF THE INVENTION

In accordance with the present invention, there is provided a process for rejuvenating a highly siliceous noble metal-containing zeolite catalyst which is in a deactivated state. Such deactivation can result from use as well as poor preparation. For purposes of the present invention, a highly siliceous zeolite may be defined as a zeolite having a framework silica to alumina ratio of at least about 20 or 30. This rejuvenation process disperses noble metals which have become agglomerated or which have migrated outside the zeolite pore as a result of such procedures as preparative calcination, oxidative regeneration or hydrocarbon processing. The process of the present invention is believed to rejuvenate deactivated highly siliceous zeolites by increasing noble metal dispersion as well as reducing noble metal crystallite size.

Regeneration of the catalyst according to the present invention is carried out in a series of steps. The deactivated catalyst may optionally be contacted with oxygen or oxygen-containing gas such as air at elevated temperatures until all or a substantial portion of the coke deposits present are removed. Suitable conditions for the coke burning step include temperatures ranging from about 260° to 538° C. (500 to 1000° F.) or even higher, and oxygen concentrations ranging from about 0.1 to 10 mol percent. The period of time for which the coke burning step is carried out will vary depending on temperature, oxygen concentration and the amount of coke on the catalyst.

The deactivated highly siliceous zeolite catalyst is initially reduced in hydrogen and then contacted with a stream of inert gas containing 0.001 to 10 weight percent of hydrogen halide (HX), preferably hydrogen chloride (HCl). The noble metal is subsequently redispersed by contacting the catalyst with a stream of inert gas containing 0.001 to 10 weight percent halogen (X) in the form of $X_2$ or an X-containing organic material. X may be selected from the group consisting of F, Cl, Br and I. After redispersion the catalyst is again reduced in hydrogen.

The catalyst treated by the method of the present invention contains at least one platinum group metal such as platinum, palladium, iridium, osmium, rhodium and ruthenium. Where said catalyst contains more than one metal, the other metal or metals can be selected from the group consisting of Group IB, Group IVB, Group VIIA, and Group VIII metals. Generally, the catalyst treated by the present invention has a noble metal content ranging from about 0.01 to 10 weight percent, preferably about 0.1 to 3 weight percent.

DESCRIPTION OF THE SPECIFIC EMBODIMENTS

The present invention is useful in reactivating noble metal-containing zeolite catalysts which are in a deactivated state. When it becomes apparent that a catalyst has become deactivated, the hydrocarbon processing step is stopped by terminating the flow of hydrocarbon feedstock. Preferably, the reactor is purged of hydrocarbons by feeding a hydrogen stream therethrough. Temperatures of about 300° to 454° C. (572 to 850° F.) and pressures ranging from atmospheric to the operating pressure of the process may be used in the hydrogen purge.

The reactor may also be purged subsequently with an inert gas in order to remove the hydrogen. Suitable purge conditions include temperatures of about 300 to 454° C. (572 to 850° F.) and pressures of about 1 to 70 atm, using a stream of an inert gas such as nitrogen.

Optionally, the novel process of this invention may be carried out by first treating a spent noble metal-containing highly siliceous zeolite catalyst with oxygen, or an oxygen-containing gas such as air, at elevated temperatures until all or a substantial portion of the carbon is removed. This coke burning step is not narrowly critical and suitable conditions range from temperatures of about 260° to 538° C. (500 to 1000° F.) or even higher, and oxygen concentrations ranging from about 0.10 to 10 mol percent. The duration of the coke burning step is also not narrowly critical and will obviously vary depending on the temperature, oxygen concentration, as well as the amount of coke on the catalyst. Preferred operation of the coke burning step would include treating a spent catalyst with about 0.2 to 7 mol percent of oxygen, at temperatures of about 371° to 454° C. (700° to 850° F.), at pressures of 1 to 70 atmospheres.

The deactivated catalyst, which can be optionally treated for removal of carbon as noted above, is reduced with a suitable reducing agent such as hydrogen or hydrogen-containing gas in order to convert noble metal into its elemental form. This step is also not narrowly critical and is well known in the prior art. The preferred reduction agent is hydrogen and temperatures usually employed range from about 260° to 538° C. (500° to 1000° F.) for periods of time ranging from 1 to 24 hours. The pressure of hydrogen is not narrowly critical but usually ranges from about 1 to 70 atmospheres.

The next step in the novel process of this invention is pretreatment of the reduced catalyst with gas stream, preferably nitrogen, which also contains hydrogen halide, preferably hydrogen chloride. This inert gas stream may optionally contain oxygen in amounts of 1 to 20 volume percent, or sources of oxygen such as water. The treatment with hydrogen halide is carried out at temperatures ranging from about 250° to 450° C. (482° to 842° F.) until Cl breakthrough is observed at the reactor outlet. This period of time may range from about 0.5 to about 24 hours. The amount of halogen in the inert gas stream may vary from about 0.001 to 10 weight percent of the inert gas stream, preferably about 0.01 to 2.0 weight percent. The treatment with hydrogen halide can be carried out at pressures ranging from about 1 to 70 atmospheres.

Pretreatment of the reduced catalyst is then followed by a halogen activation step, preferably a chlorine activation step, which may be carried out either in the absence or presence of oxygen or source of oxygen such as water in amounts of 1 to 20 volume percent. The activation procedure with halogen is also not narrowly critical and can be carried out by contacting the catalyst with an inert gas stream which contains 0.001 to 10 weight percent X in the form of $X_2$ or a halogen-containing organic material, at about 250° to 500° C. (482° to 932° F.) and, more preferably, from about 350° to 450° C. (662° to 842° F.), for a period of time required to effect noble metal dispersion. The time needed may range up to about 4 hours. Preferably, the inert gas stream contains 0.01 to 2.0 weight percent X. During this redispersion step, pressure is maintained at about 1 to 70 atmospheres, preferably about 1 to 5. After redispersion the catalyst may be purged with an inert gas such as nitrogen to remove any residual oxygen or halogen. The activation may alternatively be carried out in the presence of a halogen-containing material. Suitable halogen-containing materials may include $CH_3X$, $CH_2X_2$, and $CHX_3$. Exemplary materials are $CH_3Cl$, $CH_2Cl_2$ and $CHCl_3$.

After halogen activation, the catalyst is treated with a suitable reducing agent, typically, dry hydrogen. Conditions include temperatures ranging from about 250° to 550° C. (482° to 1022° F.) for periods of time ranging from about 1 to 10 hours. Preferred reduction conditions include temperatures ranging from about 350° to 480° C. (662° to 896° F.) and pressures of about 1 to 70 atmospheres.

The supported noble metal-containing catalyst composites that are regenerated by the process of the present invention comprise a highly siliceous zeolite material in combination with a hydrogenation-dehydrogenation component containing a noble metal. Such noble metals can include platinum, palladium, platinum and at least one other metal such as iridium, osmium, rhenium and ruthenium. One or more non-noble metals may optionally be present. Such metals are selected from the group consisting of Group IB, Group IVB, Group VIIA and Group VIII metals. The process of the present invention can be suitable for rejuvenating highly siliceous zeolites having silica-alumina ratios of at least 10, 20, 30, 40, 100 or even 200 or greater. In cases where iridium is used as a hydrogenation-dehydrogenation component, oxygen or sources thereof should be absent in the rejuvenation steps where HCl or $Cl_2$ is employed.

The highly siliceous zeolites which may be rejuvenated by the process of the present invention include large pore zeolites such as Zeolite Y, zeolite beta, ZSM-3, ZSM-4, ZSM-18 and ZSM-20, as well as medium pore zeolites such as ZSM-5, ZSM-11, ZSM-5/ZSM-11 intermediates, ZSM-12, ZSM-23, ZSM-35, ZSM-38, ZSM-48 and other similar materials.

Zeolite Y is described in greater detail in U.S. Pat. No. 3,130,007. The entire description contained within this patent, particularly the X-ray diffraction pattern of therein disclosed Zeolite Y, is incorporated herein by reference.

Zeolite beta is described in U.S. Pat. No. 3,308,069. That description, including the X-ray diffraction pattern of zeolite beta, is incorporated herein by reference.

ZSM-3 is described in greater detail in U.S. Pat. No. 3,415,736. That description, and in particular the X-ray diffraction pattern of said ZSM-3, is incorporated herein by reference.

ZSM-4 is described in U.S. Pat. No. 4,021,447. That description, and in particular the X-ray diffraction pattern disclosed therein, is incorporated herein by reference.

ZSM-5 is described in greater detail in U.S. Pat. Nos. 3,702,886 and Re 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-5/ZSM-11 intermediate compositions are described in U.S. Pat. No. 4,229,424. That description, and in particular the X-ray diffraction pattern of said compositions disclosed therein, is incorporated herein by reference.

ZSM-12 is described in U.S. Pat. No. 3,832,449. That description, and in particular the X-ray diffraction pattern disclosed therein, is incorporated herein by reference.

ZSM-18 is described in U.S. Pat. No. 3,950,496. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in U.S. Pat. No. 4,234,231, the entire contents of which is incorporated herein by reference.

The process of this invention may also be used to regenerate multimetallic catalysts which contain one of the above noble metals and another metal selected from Groups IB, IVB, VIIA, or VIII of the Periodic Table. The zeolite catalyst treated by the process of the present invention can be binder-free or it may contain an inorganic oxide binder selected from the group consisting of alumina, silica, silica-alumina, magnesia, titania, zirconia, and thoria. The process of the present invention may be carried out either in the absence or presence of water.

This invention will be better understood by reference to the following examples.

Example 1 —Preparation of 0.6% Pt/Zeolite Beta Catalyst

An as-synthesized zeolite beta with a $SiO_2/Al_2O_3$ ratio of about 30, mixed with an alumina binder, was calcined in flowing $N_2$ at 500° C. for 4 hours followed by air at the same temperature for 5 hours. The zeolite was then dealuminized to an effective $SiO_2/Al_2O_3$ ratio of about 140 by steaming. Platinum was introduced into the dealuminized zeolite via ion exchange of platinum tetraamine at room temperature overnight. Ion exchange of platinum was accomplished by contacting zeolite beta with $Pt(NH_3)_4(NO_3)_2$ at a ratio of 83:1 by weight. The platinum-exchanged material was washed and oven-dried followed by air calcination at 500° C. for 2 hours.

Example 2 —Rejuvenation of Platinum-Containing Highly Siliceous Zeolite with HCl and $Cl_2$ Fifteen grams of the catalyst of Example 1 having a Pt dispersion of 17% were placed in a quartz reactor and reduced in hydrogen at 400° C. for one hour. Following reduction, hydrogen chloride in nitrogen carrier gas was introduced to the catalyst for two hours at 400° C. and at a concentration of 1.5 wt % Cl/hr.gram catalyst. The partial pressure of HCl was about 24 torr. After hydrogen chloride treatment, chlorine was introduced into the inert gas stream replacing hydrogen chloride at the same concentration for two hours at 450° C. Partial pressure of $Cl_2$ was about 12 torr. Total pressure was 1 atmosphere. The catalyst was then reduced in flowing hydrogen at 450° C. The metal surface area was measured by hydrogen chemisorption before and after treatment. Platinum dispersion was increased from 17% to 67% as a result of the $H_2$-HCl-$Cl_2$-$H_2$ treatment.

Example 3 —Rejuvenation of a Platinum-Containing Highly Siliceous Zeolite with HCl and $Cl_2$ in the Presence of $O_2$ Fifteen grams of the catalyst of Example 1 having a Pt dispersion of 13% were placed in a quartz reactor and reduced in hydrogen at 400° C. for one hour. Following reduction, hydrogen chloride in a nitrogen carrier gas was introduced to the catalyst for two hours at 400° C., a concentration of 1.5 wt % Cl/hr.gram catalyst. The partial pressure of HCl was about 20 torr while that of oxygen was about 150 torr. After hydrogen chloride treatment, chlorine was introduced into the gas stream replacing hydrogen chloride at the same concentration for about four hours at 450° C. Partial pressure of $Cl_2$ was about 10 torr while partial pressure of oxygen was about 150 torr. Total pressure was 1 atmosphere. The catalyst was then reduced in flowing hydrogen at 450° C. The metal surface area was measured by hydrogen chemisorption before and after treatment. Platinum dispersion was increased from 13% to 77% as a result of the treatment.

Example 4 —Rejuvenation of Platinum-Containing Highly Siliceous Zeolite with HCl and $Cl_2$ in the Presence of $H_2O$ Fifteen grams of the catalyst of Example 1 having a Pt dispersion of 10% are placed in a quartz reactor and reduced in hydrogen at 400° C. for one hour. Following reduction, hydrogen chloride in nitrogen carrier gas is introduced to the catalyst for two hours at 400° C. and at a concentration of 1.5 wt % Cl/hr.gram catalyst. The partial pressure of HCl is about 20 torr while that of water is about 20 torr. After hydrogen chloride treatment, chlorine is introduced into the inert gas stream replacing hydrogen chloride at the same concentration for about four hours at 450° C. Partial pressure of $Cl_2$ is about 10 torr, while the partial pressure of water is about 20 torr. Total pressure is 1 atmosphere. The catalyst is then reduced in flowing hydrogen at 450° C. The metal surface area is measured by hydrogen chemisorption before and after treatment. Platinum dispersion is increased from 10% to 60% as a result of the treatment.

Example 5 —Rejuvenation of Platinum-Containing Highly Siliceous Zeolite with HCl and Methylene Chloride Fifteen grams of the catalyst of Example 1 having a Pt dispersion of 0.10 are placed in a quartz reactor and reduced in hydrogen at 400° C. for one hour. Following reduction, hydrogen chloride in nitrogen carrier gas is introduced to the catalyst for two hours at 400° C. and at a concentration of 1.5 wt % Cl/hr.gram catalyst. The partial pressure of HCl is about 20 torr. After hydrogen chloride treatment, chlorine is introduced into the inert gas stream in the form of methylene chloride, replacing hydrogen chloride at the same concentration for four hours at 450° C. Partial pressure of methylene chloride is about 10 torr. Total pressure is 1 atmosphere. The catalyst is then reduced in flowing hydrogen at 450° C. The metal surface area is measured by hydrogen chemisorption before and after treatment. Platinum dispersion is increased from 10% to 50% as a result of the treatment.

It is claimed:

1. A process for rejuvenating a steamed catalyst comprising an alumina binder and a highly siliceous zeolite having a framework silica-alumina ratio of at least about 20 containing agglomerated noble metal selected from the group consisting of platinum, palladium, osmium, rhodium and ruthenium, which process comprises initially reducing the steamed, deactivated catalyst comprising an alumina binder, pretreating the reduced catalyst with a gas stream containing about 0.001 to 10 weight percent hydrogen halide and about 1 to 20 volume percent oxygen until breakthrough, redispersing noble metal throughout the catalyst by contacting the pretreated catalyst with a gas stream containing about 1 to 20 volume percent oxygen and about 0.001 to 10 weight percent X in the form of $X_2$ or X-containing organic material, where X is selected from the group consisting of F, Cl, Br and I, and subsequently reducing said catalyst.

2. The process of claim 1 wherein said hydrogen halide is hydrogen chloride and X is Cl.

3. The process of claim 1 wherein said catalyst is contacted with an oxygen-containing gas at elevated temperatures prior to the initial reduction in order to remove coke from the catalyst.

4. The process of claim 3 wherein said oxygen-containing gas contains 0.1 to 10 mol percent oxygen, and said elevated temperatures range from about 260° to 538° C.

5. The process of claim 1 wherein said catalyst is initially reduced with hydrogen at temperatures ranging from about 260° to 538° C. and pressures ranging from about 1 to 70 atmospheres, pretreated with said gas stream containing hydrogen chloride at temperatures ranging from about 250° to 450° C. and pressures ranging from about 1 to 70 atmospheres, treated with said gas stream containing chlorine in the form of $Cl_2$ or chlorine-containing organic material for redispersion of noble metal at temperatures ranging from about 250° to 500° C. at pressures ranging from about 1 to 70 atmospheres, and subsequently reduced with dry hydrogen at temperatures ranging from about 250° to 550° C. and pressures of about 1 to 40 atmospheres.

6. The process of claim 5 wherein said pretreating is carried out at temperatures ranging from about 300° to 450° C. and pressures ranging from about 1 to 5 atmospheres, and said redispersing of noble metal is carried out at temperatures ranging from about 350° to 450° C. and pressures ranging from about 1 to 5 atmospheres.

7. The process of claim 1 wherein the framework silica-alumina ratio is at least about 30.

8. The process of claim 7 wherein the framework silica-alumina ratio is at least about 100.

9. The process of claim 8 wherein the framework silical-alumina ratio is at least about 200.

10. The process of claim 1 wherein said zeolite is selected from the group consisting of ZSM-5, ZSM-5/ZSM-11 intermediate, ZSM-11, ZSM-12, ZSM-22, ZSM-23, ZSM-35, ZSM-38 and ZSM-48.

11. The process of claim 1 wherein said zeolite is selected from the group consisting of zeolite beta, zeolite Y, ZSM-3, ZSM-4, ZSM-18 and ZSM-20.

12. The process of claim 1 wherein said zeolite is zeolite beta.

13. The process of claim 1 wherein said zeolite is ZSM-5.

14. The process of claim 1 wherein said zeolite contains an additional metal selected from the group consisting of Group IB, Group IVB and Group VIIA metals.

15. The process of claim 1 wherein said zeolite catalyst contains about 0.01 to 10 weight percent noble metal.

16. The process of claim 15 wherein said zeolite catalyst contains about 0.1 to 3 weight percent noble metal.

17. The process of claim 1 wherein said metals are introduced to the zeolite by impregnation.

18. The process of claim 1 wherein said metals are introduced to the zeolite by ion exchange.

19. The process of claim 1 wherein said redispersing occurs in the presence of said gas stream which contains about 0.01 to 2.0 weight percent X as $X_2$.

20. The process of claim 1 wherein said redispersing occurs in the presence of said gas stream which contains about 0.01 to 2.0 weight percent chloride as a Cl-containing organic material selected from the group of $CH_3Cl$, $CH_2Cl_2$, $CHCl_3$, $CCl_4$ and $C_2H_5Cl$.

* * * * *